(12) United States Patent
Jang et al.

(10) Patent No.: US 6,297,310 B1
(45) Date of Patent: Oct. 2, 2001

(54) BARRIER RIB COMPOSITION FOR PLASMA DISPLAY PANEL

(75) Inventors: Woo Sung Jang, Seoul; Je Seok Kim, Kyunggi-do, both of (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 09/377,164

(22) Filed: Aug. 19, 1999

(30) Foreign Application Priority Data

Aug. 21, 1998 (KR) .................................................. 98-34028

(51) Int. Cl.$^7$ ....................................................... C08K 3/00
(52) U.S. Cl. ............................................................. 524/494
(58) Field of Search ............................................... 524/494

(56) References Cited

U.S. PATENT DOCUMENTS 4,186,234 * 1/1980 Sakashita et al. .................... 428/283

FOREIGN PATENT DOCUMENTS

| | | |
|---|---|---|
| 01-241731 | 9/1989 | (JP) . |
| 08-255510 | 10/1996 | (JP) . |
| 09-259754 | 10/1997 | (JP) . |
| 10-208626 | 8/1998 | (JP) . |
| 11-100232 | 4/1999 | (JP) . |

* cited by examiner

*Primary Examiner*—Edward J. Cain
(74) *Attorney, Agent, or Firm*—Fleshner & Kim, LLP

(57) ABSTRACT

A barrier rib composition for a plasma display panel that is adapted to have a high molding property at a low pressure. In the barrier rib composition, a weight ratio of a plasticizer to a binder is less than 1. Accordingly, the barrier rib composition prevents a deformation of a substrate upon molding of the barrier rib and forms a high detailed barrier rib having a high aspect ratio.

13 Claims, 4 Drawing Sheets

FIG.3

| COMPOSITION | COMPONENT RATIO(WEIGHT%) |
|---|---|
| SOLVENT | 50-90 |
| PLASTICIZER | 1-30 |
| BINDER | 0.5-30 |
| ADDITIVE | 0.1-10 |

BARRIER RIB COMPOSITION FOR PLASMA DISPLAY PANEL

BACKGROUND OF THE INVENTION

1. Field of the Invention

This invention relates to a barrier rib composition for a plasma display panel and more particularly to a barrier rib composition for a plasma display panel that is adapted to have a high molding property at a low pressure.

2. Description of the Related Art

As shown in FIG. 1, a conventional plasma display panel of alternating current driving system (hereinafter, AC-system PDP) includes a lower glass substrate 10 mounted with an address electrode 12, and an upper glass substrate 20 mounted with a transparent electrode pair 22. A desired thickness of lower dielectric thick film 14 for forming a wall charge and a barrier rib 16 for dividing discharge cells are sequentially formed on the lower glass substrate 10 mounted with the address electrode 12. A desired thickness of fluorescent film 18 is coated on the surface of the lower dielectric thick film 14 and the wall surface of the barrier rib 16. This fluorescent film 18 is radiated by an ultraviolet ray generated during the plasma discharge to generate a visible light. Meanwhile, an upper dielectric thick film 24 and a protective film 26 are sequentially formed on the bottom surface of the upper glass substrate 20 mounted with the transparent electrode pair 22. The upper dielectric thick film 24 forms a wall charge like the lower dielectric thick film 14, and the protective film 26 protects the upper dielectric thick film 24 from an impact of a gas ion during the plasma discharge. Such an AC-system PDP has discharge cells formed by isolating the lower and upper glass substrates 14 and 16 through the barrier rib 8. He+Xe mixture gas or Ne+Xe mixture gas is sealed into the discharge cells.

The barrier rib has more and more made into a high detailed shape in accordance with a tendency to apply a PDP to a high-resolution display. In other words, since a space become smaller as a resolution of the panel increases, it is necessary to form the barrier rib at a high level so as to improve the efficiency. Accordingly, the barrier rib requires a high aspect ratio having a narrow width and a great height. In order to meet such a requirement, there has been suggested the low temperature co-fired ceramic on metal (LTCCM) system that is capable of simplifying the process as well as fabricating a high detailed barrier rib having a high aspect ratio.

Referring to FIGS. 2A to 2F, there is shown a method of fabricating a barrier rib according to the conventional LTCCM system step by step. First, a green sheet 30 is formed. Barrier rib material slurry is prepared in the first process. The barrier rib material slurry is prepared by mixing a barrier rib composition at a component ratio as indicated in the following Table:

TABLE 1

| Barrier Rib Composition and Component Ratio | |
|---|---|
| Composition | Component Ratio (weight %) |
| Glass Powder | 70 |
| Solvent | 24 |
| Plasticizer | 2 |

TABLE 1-continued

| Barrier Rib Composition and Component Ratio | |
|---|---|
| Composition | Component Ratio (weight %) |
| Binder | 3 |
| Additive | 1 | wherein the component ratio is calculated assuming that a weight of glass be 100 weight %. As seen from the Table 1, the conventional barrier rib composition contains 70 weight % glass powder, 24 weight % solvent, 2 weight % plasticizer, 3 weight % binder and 1 weight % additive. The barrier rib material slurry is prepared by mixing the barrier rib composition at a component ratio in the Table 1. The barrier rib composition keeps a liquid state and is used for a tape casting.

Such a barrier rib composition is largely divided into an inorganic substance and an organic substance. The glass powder corresponds to the inorganic substance while the solvent, the plasticizer, the binder and the additive correspond to the organic substance. A function of the organic substance will be described in detail. The binder binds the glass powder and keeps a viscosity of the glass powder. Poly-Vinyl-Butyral(PVB) is used as the binder. The plasticizer prevents the green sheet 30 from being hardened easily to give certain flexibility to the green sheet 30. Butyl-Benzyl-Pthalate(BBP) is used as the plasticizer. The solvent is responsible for melting the binder and the plasticizer. Ethanol or Methyl-Ethyl-Ketone(MEK) is used as the solvent. The additive includes a dispersant and a surfactant so as to prevent a conglomeration of the powder. Fish oil is used as the additive.

Meanwhile, an organic substance component ratio of the barrier rib is indicated in the following Table:

TABLE 2

| Organic Substance Component Ratio of Barrier Rib | |
|---|---|
| Composition | Component Ratio (weight %) |
| Solvent | 82 |
| Plasticizer | 6 |
| Binder | 9 |
| Additive | 3 | wherein the component ratio is calculated assuming that a weight of the organic substance be 100 weight %. As seen from the Table 2, the organic substance of the conventional barrier rib contains 82 weight % solvent, 6 weight % plasticizer, 9 weight % binder and 3 weight % additive.

In the second process, a desired thickness of green sheet 30 is prepared by putting the barrier rib material slurry into a tape casting device(not shown). The green sheet 30 prepared by such a process is shown in FIG. 2A.

Next, the green sheet 30 is disposed on a substrate 32. The green sheet 30 is deposited on the upper part of the substrate 32 having a desired thickness(e.g., 0.5 mm). The substrate 32 is made from glass, glass-ceramic, ceramic and metal, etc. Particularly, Titanium having a thickness of 0.5 mm to 1 mm is mainly used as the metal. The green sheet 30 disposed on the upper part of the substrate 32 is shown in FIG. 2B.

Subsequently, an electrode 36 is formed on the green sheet 30. The electrode 36 is formed by putting the green sheet 30 deposited on the substrate 32 into a printer(not shown). The electrode 36 formed on the upper part of the green sheet 30 is shown in FIG. 2C.

Next, an electrode protective layer 34 is formed on the upper part of the electrode 36. The electrode protective layer 34 protects the electrode 36 from a sputtering caused by the discharge, and accumulates an electric charge produced by the discharge to lower a driving voltage. The electrode protective layer 34 formed on the upper part of the electrode 36 is shown in FIG. 2D.

Finally, a barrier rib 40 is formed by positioning a mold 38 with a shape of barrier rib on the upper part of the substrate 32 and then applying a desired pressure thereto. The barrier rib 40 is molded at the green sheet 30 by positioning the mold 38 having a hole 38a in a shape of barrier rib on the upper part of the substrate 32 and then applying a desired pressure thereto. In this case, a pressing is made between the mold 38 and the substrate 32, or a desired pressure is applied by means of a roller and the like. At this time, the green sheet 30 is moved into the hole 38a for a formation of the barrier rib by a pressure applied to the mold 38 and is molded into a shape of barrier rib. For instance, a pressure of 130 kgf/cm$^2$ is applied in the molding process. This results from a fact that a barrier rib having a size intended by a manufacturer can not be made until a hardening is rapidly progressed by a component ratio of the green sheet 30 so as to apply a high pressure. The process of molding the barrier rib is shown in FIG. 2E. Also, the barrier rib 40 in which a molding is completed is plasticized at a desired temperature. The barrier rib 40 formed by the plasticization is shown in FIG. 2F.

As described above, the prior art has a problem in that, since a deformation of the substrate is caused when a high pressure is applied to form the barrier rib, a performance of the PDP is deteriorated. Thus, it is necessary to provide a barrier rib composition having an excellent molding property at a low pressure.

SUMMARY OF THE INVENTION

Accordingly, it is an object of the present invention to provide a barrier rib composition for a plasma display panel that is adapted to have a high molding property at a low pressure.

In order to achieve these and other objects of the invention, a barrier rib composition for a high-brightness plasma display panel according to the present invention has a weight ratio of a plasticizer to a binder less than 1.

BRIEF DESCRIPTION OF THE DRAWINGS

These and other objects of the invention will be apparent from the following detailed description of the embodiments of the present invention with reference to the accompanying drawings, in which:

FIG. 3 is a view for explaining a barrier rib composition according to an embodiment of the present invention.

DETAILED DESCRIPTION OF THE PREFERRED EMBODIMENT

A barrier rib composition for a high-brightness plasma display panel according to the present invention preferably includes 60 weight % glass powder, 3 weight % organic binder, 5 weight % plasticizer, 31 weight % solvent and 1 weight % additive.

Figure 1:
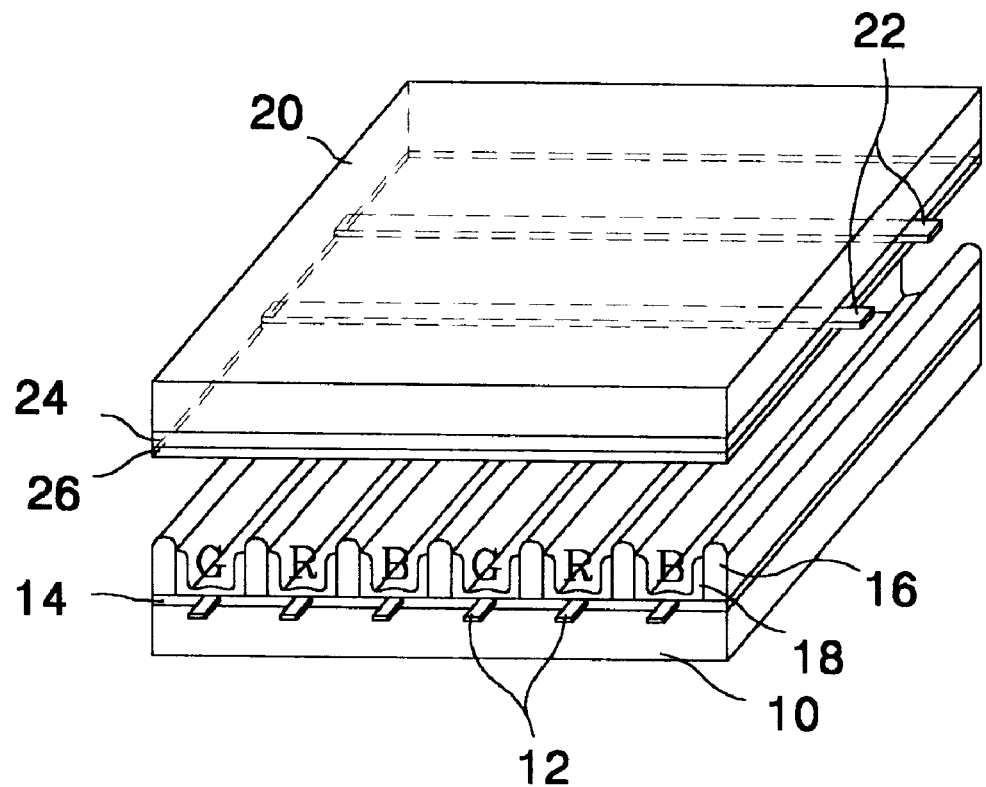
FIG. 1 is a perspective view showing the structure of a conventional plasma display panel.
Figure 2A:
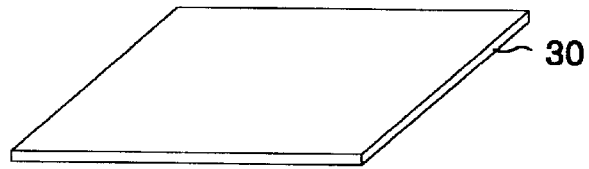
FIG. 2A to FIG. 2F show a method of fabricating a barrier rib in the conventional plasma display panel step by step.
Figure 2B:
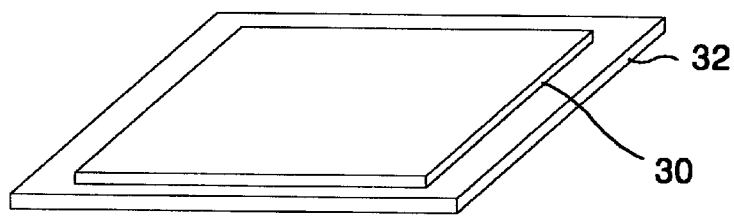
Figure 2C:
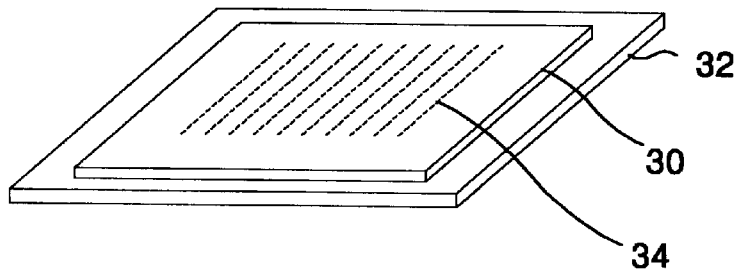
Figure 2D:
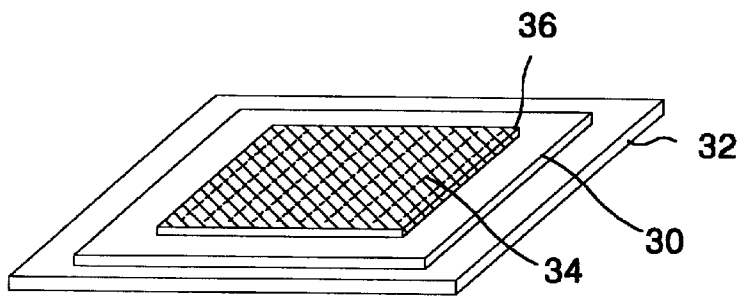
Figure 2E:
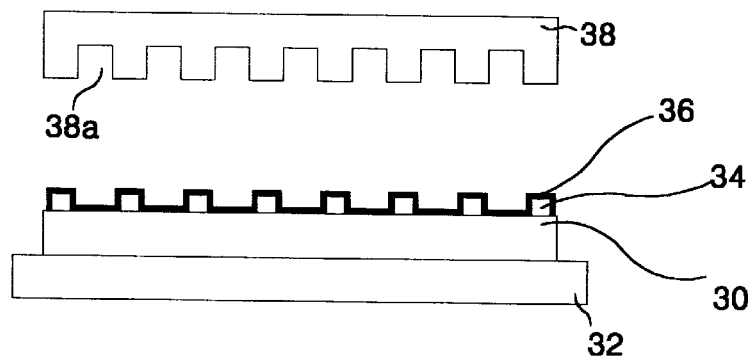
Figure 2F:
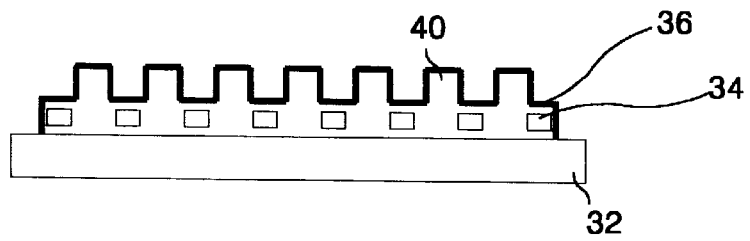

A method of fabricating the barrier rib will be described below. First, barrier rib material slurry is prepared by mixing a solvent, a plasticizer, an organic binder and an additive with glass powder. Subsequently, a green sheet is formed by putting the barrier rib slurry into a tape casting device (not shown). A high detailed barrier rib having a high aspect ratio at a low pressure is obtained by treating the green sheet made in this manner in similarity to the process as shown in FIGS. 2A to 2F.

Hereinafter, an embodiment of the barrier rib composition for a plasma display panel according to the present invention will be described. A composition and a component ratio of the barrier rib according to an embodiment of the present invention is indicated in the following Table:

TABLE 3

Barrier Rib Composition and Component ratio

| Composition | Component Ratio (weight %) |
| --- | --- |
| Glass Powder | 60 |
| Solvent | 31 |
| Plasticizer | 5 |
| Binder | 3 |
| Additive | 1 | wherein the component ratio is calculated assuming that a weight of glass be 100 weight %.

Meanwhile, an organic substance component ratio of the barrier rib is indicated in FIG. 3. An organic substance of the barrier rib according to the present invention contains 50 to 90 weight % solvent, 1 to 30 weight % plasticizer, 0.5 to 30 weight % binder and 0.1 to 10 weight % additive. Herein, an organic substance component ratio of the barrier rib was calculated assuming that a weight of the organic substance be 100 weight %. Functions of the plasticizer, the binder, the additive and the solvent will be omitted because they have been explained sufficiently with reference to FIG. 2A earlier. In this case, as shown in FIG. 3, it is preferable to allow a weight ratio of the plasticizer to the binder to be less than 1 so as to form a slurry. Particularly, it is desirable to keep a weight ratio of the plasticizer to the binder at a range of 0.3 to 1 for the purpose of fabricating a barrier rib having an excellent molding property. Accordingly, a green sheet satisfying the barrier rib component ratio according to the present invention has a good molding property at a low pressure.

Meanwhile, at a designer's intent, the organic substance according to the present invention has a component ratio as indicated in the following Table:

TABLE 4

Organic Substance Component Ratio of Barrier Rib

| Composition | Component Ratio (weight %) |
| --- | --- |
| Solvent | 75–85 |
| Plasticizer | 5–10 |
| Binder | 3–7 |
| Additive | 1–5 |

As seen from the Table 4, an organic substance of the barrier rib according to the present invention contains 75 to 85 weight % solvent, 5 to 10 weight % plasticizer, 3 to 7 weight % binder and 1 to 5 weight % additive. In the case of the organic substance component ratio as indicated in the Table 4, the barrier rib has an improved molding property.

Hereinafter, a method of fabricating a barrier rib using the barrier rib composition for a plasma display panel according to the present invention will be described. First, a green sheet 30 is formed. A barrier rib material slurry is prepared in the first process. The barrier rib material slurry is prepared by mixing a barrier rib composition at a component ratio as indicated in the Table 3. In this case, it is desirable that the organic substance composition of the barrier rib be kept at a range satisfying a component ratio as shown in FIG. 3. It is preferable to allow a weight ratio of the plasticizer to the binder to be less than 1 so as to form a slurry. Particularly, it is desirable to keep a weight ratio of the plasticizer to the binder at a range of 0.3 to 1 for the purpose of fabricating a barrier rib having an excellent molding property. In the second process, a desired thickness of green sheet is formed by putting the barrier rib material slurry into a tape casting device(not shown). Meanwhile, the organic component ratio as indicated in the Table 4 may be used at a designer's intent so that a molding property of the barrier rib can be improved. The barrier rib material slurry keeps a liquid state and is used for the tape casting. The barrier rib material slurry is put into the tape casting device to form the green she et.

Subsequently, a barrier rib formation method using the green sheet will be omitted because it has the process similar to FIGS. 2B to 2F. Accordingly, a barrier rib for a PDP formed by utilizing the green sheet having the barrier rib composition according to the present invention has an improved molding property in comparison to the prior art.

For instance, a pressure of 100 kgf/cm$^2$ is applied to the mold in the molding process. This reduces 30% the pressure in comparison to a molding using the conventional barrier rib composition to thereby prevent a deformation of the substrate generated by a pressure applied in the molding process. Also, the barrier rib composition according to the present invention has an excellent molding property to form a barrier rib having a high detailed shape and a high aspect ratio. As described above, a barrier rib composition for a plasma display device according to the present invention applies a low pressure to form a barrier rib, so that it prevents a deformation of the substrate and forms a high detailed barrier rib having a high aspect ratio.

Although the present invention has been explained by the embodiments shown in the drawings described above, it should be understood to the ordinary skilled person in the art that the invention is not limited to the embodiments, but rather that various changes or modifications thereof are possible without departing from the spirit of the invention. Accordingly, the scope of the invention shall be determined only by the appended claims and their equivalents.

What is claimed is:

1. A barrier rib composition for a plasma display panel comprising:
   a glass powder;
   a binder for binding the glass powder and keeping a viscosity;
   a plasticizer for preventing a hardening of a green sheet to give a flexibility to the green sheet;
   a solvent for melting the binder and the plasticizer; and
   an additive for preventing a conglomeration of the plasticizer and the binder, wherein a weight ratio of the plasticizer to the binder is less than 1, and wherein the composition is used as a barrier rib for a plasma display panel.

2. The barrier rib composition as claimed in claim 1, wherein a weight ratio of the plasticizer to the binder is 0.3 to 1.

3. The barrier rib composition as claimed in claim 1, wherein said barrier rib composition comprises:
   0.5 to 30 weight % binder;
   1 to 30 weight % plasticizer;
   50 to 90 weight % solvent; and
   0.1 to 10 weight % additive.

4. The barrier rib composition as claimed in claim 3, wherein said binder has a component ratio of 3 to 7 weight %.

5. The barrier rib composition as claimed in claim 3, wherein said plasticizer has a component ratio of 5 to 10 weight %.

6. The barrier rib composition as claimed in claim 3, wherein said solvent has a component ratio of 75 to 85 weight %.

7. The barrier rib composition as claimed in claim 3, wherein said additive has a component ratio of 1 to 5 weight %.

8. The barrier rib composition as claimed in claim 1, wherein said barrier rib composition comprises:
   3 to 7 weight % binder;
   5 to 10 weight % plasticizer;
   75 to 85 weight % solvent; and
   1 to 5 weight % additive.

9. The barrier rib composition as claimed in claim 1, wherein the hardening speed of the composition is low so that the barrier rib can be molded at a low pressure.

10. The barrier rib composition as claimed in claim 1, wherein the composition has a high molding property so that a barrier rib can be formed.

11. The barrier rib composition as claimed in claim 1, wherein the binder comprises polyvinyl butyral, the plasticizer comprises butyl-benzyl-phthalate, the solvent comprises ethanol or methyl-ethyl-ketone, and the additive comprises fish oil.

12. The barrier rib composition as claimed in claim 1, wherein the composition comprises:
   60 weight % of glass powder;
   3 weight % binder;
   5 weight % plasticizer;
   31 weight % solvent; and
   1 weight % additive.

13. The barrier rib composition as claimed in claim 12, wherein the binder comprises polyvinyl butyral, the plasticizer comprises butyl-benzyl-phthalate, the solvent comprises ethanol or methyl-ethyl-ketone, and the additive comprises fish oil.

* * * * *